United States Patent
Fukumura et al.

[15] 3,666,756
[45] May 30, 1972

[54] ESTERS OF 3-PYROZOLEMETHANOLS AND PROCESS FOR THEIR PREPARATIONS

[72] Inventors: Masataka Fukumura, Takarazuka-shi; Kozo Shimago, Minoo-shi; Shigeru Okano, Ibaragi-shi; Hiroshi Nakatani, Toyonaka-shi; Kenji Hesaka, Minoo-shi, all of Japan

[73] Assignee: Sumitomo Chemical Company, Ltd., Osaka, Japan

[22] Filed: June 16, 1969

[21] Appl. No.: 833,812

[30] Foreign Application Priority Data

June 20, 1968 Japan..................................43/43081
June 20, 1968 Japan..................................43/43082
Sept. 27, 1968 Japan..................................43/70339
Feb. 4, 1969 Japan..................................44/8658

[52] U.S. Cl. ..................260/240 J, 260/295 R, 260/310 R, 424/263, 424/273
[51] Int. Cl. ....................................................C07d 49/18
[58] Field of Search......................260/240 J, 310 R, 295 R

[56] References Cited

OTHER PUBLICATIONS

Morrison et al., "Organic Chemistry," 2nd Ed., Allyn and Bacon, Inc., 1966, pp. 661– 665.

Rubessa, Farmaco, Ed. Sci. 22 (9), 692– 697 (1967); C.A. 68:68928t

Primary Examiner—Henry R. Jiles
Assistant Examiner—G. Thomas Todd
Attorney—Stevens, Davis, Miller & Mosher

[57] ABSTRACT

Novel pyrazole derivatives represented by the formula,

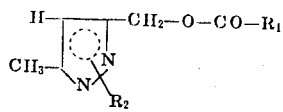

wherein $R_1$ represents an alkyl group, alkenyl group, aryl group, aryloxyalkyl group, aralkyl group, aralkenyl group, or a group containing a heterocyclic ring, and $R_2$ is a hydrogen atom or the same group as $-CO-R_1$. The pyrazole derivatives have a good antidiabetic action, and are prepared by diacylating 3-hydroxymethyl-5-methylpyrazole with an acylating agent represented by the general formula,

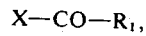

wherein X represents a halogen atom, a group of $-O-CO-R_1$ or a group of $-O-CO-O-R_3$, $R_1$ has the same meaning as defined above, and $R_3$ represents an alkyl group having one to four carbon atoms, and, if necessary, by subjecting the thus obtained diacylated pyrazole derivatives to partial hydrolysis or aminolysis.

11 Claims, No Drawings

ESTERS OF 3-PYROZOLEMETHANOLS AND PROCESS FOR THEIR PREPARATIONS

This invention relates to novel antidiabetic agents, and more particularly to novel pyrazole derivatives having good antidiabetic action and being represented by the following formula:

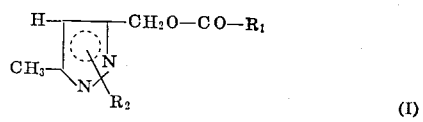

(I)

wherein $R_1$ is an alkyl group having one to 18 carbon atoms, an alkenyl group having two to 18 carbon atoms, an aryl group having six to 10 carbon atoms, an aralkyl group having seven to 11 carbon atoms, an aralkenyl group having eight to 12 carbon atoms, and aryloxyalkyl group having seven to nine carbon atoms or a heterocyclic ring having a nitrogen atom, sulfur atom or oxygen atom as a heteroatom; each alkyl, alkenyl, aryl, aralkyl or aralkenyl group, or a heterocyclic ring being unsubstituted or substituted with a halogen atom such as chlorine or bromine, or with an alkyl group such as methyl or ethyl, or with a nitro, acetylamino or hydroxyl group or with a lower alkoxy group such as methoxy or ethoxy group, and $R_2$ represents a hydrogen atom or a group represented by the formula, $-CO-R_1$, wherein $R_1$ has the same meaning as defined above.

Several sulfonylurea compounds as represented by tolbutamide and several biguanide compounds as represented by metformin have been heretofore known as antidiabetic agents.

The present inventors have studied to find compounds having significant lowering action of the blood-sugar level and low toxicity. As a result of the studies, the present inventors have found that the pyrazole derivatives represented by said general Formula (I) have a significant action to lower the blood-sugar level and further have a very low toxicity. That is to say, the present inventors have found that the pyrazole antidiabetic agents as represented by said general Formula (I) are superior to the sulfornylurea compounds in the fact that a satisfactory antidiabetic effect can be obtained by the present pyrazole derivatives even in the case that there is no insulin and is also superior to the biguanide compounds in the fact that the present pyrazole derivatives are less toxic. Further, the present inventors have found that the present pyrazole derivatives are far better characteristic than the known antidiabetics in the fact that the present pyrazole derivatives have good effect on the lipid metabolic abnormality often accompanying the diabetes with a smaller dosage.

An object of the present invention is to provide novel compounds having a very low toxicity and a good action of lowering the blood-sugar level.

Another object of the present invention is to provide a method for preparing novel pyrazole derivatives having a very low toxicity and a good action of lowering the blood-sugar level.

A further object of the present invention is to provide a pharmaceutical composition having a very low toxicity and a good action of lowering the blood-sugar level.

Still further object of the present invention is to provide a method for lowering the blood-sugar level.

Other objects of the present invention will be obvious from the description which follows.

To attain these objects, the present invention provides novel pyrazole derivatives represented by said general Formula (I).

Further, the present invention provides a method for preparing pyrazole derivatives represented by said general formula (I), which comprises contacting 3-hydroxymethyl-5-methylpyrazole with an acylating agent represented by the general formula, $$X - CO - R_1 \quad (III)$$

wherein $R_1$ has the same meaning as defined in the Formula (I), and X is a halogen atom; a group represented by the Formula, $$-O-CO-R_1$$

wherein $R_1$ has the same meaning as defined in the Formula (I); or a group represented by the formula, $$-O-CO-O-R_3$$

wherein $R_3$ is an alkyl group having one to four carbon atoms, to form a diacylated compound represented by the general formula:

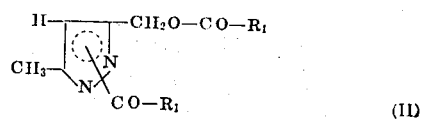

(II)

wherein $R_1$ has the same meaning as defined in the Formula (I), and further, contacting the thus obtained diacylated Compound (II), if necessary, with (1) water in the presence of an acid or alkali, or (2) a primary organic amine, secondary organic amine, or hydrazine.

Further, the present invention provides a pharmaceutical composition consisting essentially of an effective amount of a pyrazole derivative represented by the general formula (I) and a carrier used for the pharmaceutical purpose.

Still further, the present invention provides a method for lowering the blood-sugar level by administrating a pyrazole derivative represented by the general formula (I).

Examples of the aralkyl group represented by the symbol $R_1$ in the present invention include benzyl and phenethyl; examples of the aralkenyl group include styryl and cinnamyl; examples of the heterocyclic ring include pyridyl, thienyl and furyl. Examples of the halogen atoms represented by the symbol X in the present invention include chlorine and bromine.

The pyrazole derivative represented by the general formula (I) in the present invention can be obtained by acylating 3-hydroxymethyl-5-methylpyrazole thereby to form a diacylated pyrazole derivative and further partially deacylating the thus obtained diacylated pyrazole derivative, if necessary.

3-Hydroxymethyl-5-methylpyrazole, the starting material in the present invention, is a well known compound obtained by treating 3-carboalkoxy-5-methylpyrazole with such a reducing agent as lithium aluminumhydride [R. G. Jones et al.: J. O. C., 19, 1428 (1954)].

It is preferable in the present invention to conduct the diacylation of 3-hydroxymethyl-5-methylpyrazole in the presence of an inert solvent such as benzene, dioxane or pyridine. Particularly, in view of the solubilities of the raw materials, it is more advantageous to use a tertiary amine such as pyridine or triethylamine as the solvent. In the case that the acylating agent is an acid halide, that is, in the case that the acylating agent of the general formula (III) contains a halogen atom as X, it is desirable to use a dehydrohalogenating agent such as a tertiary amine, including, for example, pyridine or triethylamine.

The acylating reaction is carried out at the temperature between an ice-cooled state and the boiling point of a solvent used, for example, 0° – 120° C. Particularly, in the case that the acylating agent is an acid anhydride or a mixed anhydrides, that is, in the case that the acylating agent represented by the general formula (III) contains a group of — O—CO—$R_1$ or —O—CO—O—$R_1$ as X, it is desirable to conduct the acylation at a boiling point of the solvent used.

The acylating reaction is usually completed in 15 minutes to 2 hours.

The thus obtained diacylated pyrazole derivative is usually a mixture of 1-acyl-3-acyloxymethyl-5-methylpyrazole (II A) and 1-acyl-3-methyl-5-acyloxymethylpyrazole (II B), as shown below. The mixing ratio of (II A) to (II B) depends upon the kind of an acylating agent used, even if the reaction conditions are the same. It is possible to obtain either isomer (II A) or (II B) selectively by properly selecting an acylating agent.

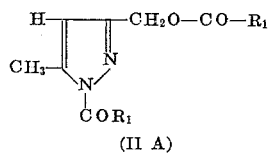
(II A)

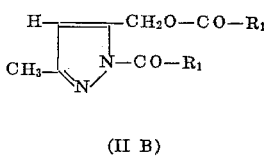
(II B)

When the diacylated pyrazole derivative is obtained as a mixture of isomers of said Formulas (II A) and (II B), the mixing ratio can be determined by such an analytical means as a chromatography or a nuclear magnetic resonance absorption spectrum measurement of the product.

The following diacylated pyrazole derivatives can be obtained according to the present invention:

1-Acetyl-3(or 5)-acetoxymethyl-5(or 3)-methylpyrazole
1-Chloroacetyl-3(or 5)-chloroacetoxymethyl-5(or 3)-methylpyrazole
1-Butyryl-3(or 5)-butyryloxymethyl-5(or 3)-methylpyrazole
1-Linolyl-3(or 5)-linolyloxymethyl-5(or 3)-methylpyrazole
1-Furoyl-3(or 5)-furoyloxymethyl-5(or 3)-methylpyrazole
1-Anisoyl-3(or 5)-anisoyloxymethyl-5(or 3)-methylpyrazole
1-Thienylacetyl-3(or 5)-thienylacetoxymethyl-5(or 3)-methylpyrazole
1-Nicotinoyl-3(or 5)-nicotinoyloxymethyl-5(or 3)-methylpyrazole
1-Caproyl-3(or 5)-caproyloxymethyl-5(or 3)-methylpyrazole
1-Benzoyl-3(or 5)-benzoyloxymethyl-5(or 3)-methylpyrazole
1-(m-Toluoyl)-3(or 5)-(m-toluoyloxymethyl)-5(or 3)-methylpyrazole
1-(p-Chlorobenzoyl)-3(or 5)-(p-chlorobenzoyloxymethyl)-5(or 3)-methylpyrazole
1-Cinnamoyl-3(or 5)-ciannamoyloxymethyl-5(or 3)-methylpyrazole
1-(β-Naphthoyl)-3(or 5)-(β-naphthoyloxymethyl)-5(or 3)-methylpyrazole
1-[p-(iso-Propylbenzoyl)]-3(or 5)-[p-(iso-propylbenzoyloxymethyl)]-5(or 3)-methylpyrazole
1-Phenylacetyl-3(or 5)-phenylacetyloxymethyl-5(or 3)-methylpyrazole
1-(3′,4′,5′-trimethoxybenzoyl)-3(or 5)-(3′, 4′,5′-trimethoxybenzoyloxymethyl)-5(or 3)-methylpyrazole
1-(p-Nitrobenzoyl)-3(or 5)-(p-nitrobenzoyloxymethyl)-5(or 3)-methylpyrazole
1-(p-Chlorophenoxyisobutyryl)-3(or 5)-(p-chlorophenoxyisobutyryloxymethyl)-5(or 3)-methylpyrazole According to the present invention, the diacylated pyrazole derivative represented by the general formula (II) is converted to a pyrazole derivative represented by the general formula (I), where $R_2$ is H, through partial deacylation of the diacylated pyrazole derivative by contacting it with water in the presence of such as acid as hydrochloric acid, sulfuric acid or phosphoric acid or such an alkali as potassium carbonate or sodium hydroxide at the ordinary temperature or an elevated temperature, for example, 20° to 100° C., to effect an hydrolysis or by contacting it with a primary amine, secondary amine, such as ethylamine, aniline, diethylamine or piperidine, or hydrazine in a solvent such as benzene, dioxane, ethylacetate or an alcohol in an ice-cooled state, or at the ordinary temperature or an elevated temperature, for example, 0° to 120° C. to effect aminolysis. In the case of hydrolysis, it is desirable in view of the solubility of diacylated pyrazole derivative (II) to conduct the reaction in the presence of a solvent such as ethanol, acetone or dioxane. The primary organic amine, secondary organic amine or hydrazine is used in a theoretically equimolar amount to the diacylated pyrazole derivative.

Only the acyl group bonded to the nitrogen atom on the pyrazole ring is selectively removed from the pyrazole ring by this hydrolysis or aminolysis.

Thus obtained 3-acyloxymethyl-5-methylpyrazole derivatives represented by the Formula (I) can also be obtained as a salt of an organic or inorganic acid.

According to the present invention, the following pyrazole derivatives represented by the Formula (I) wherein $R_2$ is hydrogen can be obtained:

3-Acetyloxymethyl-5-methylpyrazole
3-Butyryloxymethyl-5-methylpyrazole
3-Linolyloxymethyl-5-methylpyrazole
3-Furoyloxymethyl-5-methylpyrazole
3-Thienylacetyloxymethyl-5-methylpyrazole
3-Nicotinoyloxymethyl-5-methylpyrazole
3-Chloroacetyloxymethyl-5-methylpyrazole
3-Caproyloxymethyl-5-methylpyrazole
3-Anisoyloxymethyl-5-methylpyrazole
3-Benzoyloxymethyl-5-methylpyrazole
3-(p-Chlorobenzoyloxymethyl)-5-methylpyrazole
3-Cinnamoyloxymethyl-5-methylpyrazole
3-(p-Nitrobenzoyloxymethyl)-5-methylpyrazole
3-(m-Toluoyloxymethyl)-5-methylpyrazole
3-(β-Naphthoyloxymethyl)-5-methylpyrazole
3-(o-Acetylaminobenzoyloxymethyl)-5-methylpyrazole
3-(p-Isopropylbenzoyloxymethyl)-5-methylpyrazole
3-(3′,4′,5′-Trimethoxybenzoyloxymethyl)-5-methylpyrazole
3-(p-Chlorophenoxyisobutyryloxymethyl)-5-methylpyrazole The pyrazole derivatives (I) of the present invention are novel compounds not disclosed in any literature yet, and have a powerful action of lowering the blood-sugar level and a powerful action of lowering the plasma-free fatty acid level, but have a very low toxicity. Thus, the present compounds are very useful as an antidiabetic agent as well as an antihyperlipemic agent. The usefulness of the present compounds will be clearly proved by the comparative test data of antidiabetic activities as shown below:

Actions of lowering the blood-sugar level of the present compounds were tested according to the procedure described by G. C. Gerritsen et al. using glocose-injected, fasted intact rats [G. C. Gerritsen and W. E. Dulin: J. Pharmacol. exp. Therap., 150, 491 (1965)], and the results are shown in the following table. In the tests, 1 – 5 mg./kg. of the pyrazole derivatives listed in table were orally administered. Tolbutamide scarcely showed the action of lowering the blood-sugar level at 10 mg./kg. and showed a slight action of lowering the blood-sugar level at 40 mg./kg. On the other hand, all the pyrazole derivatives listed in table obviously showed the action of lowering the blood-sugar level at dosages of 1 – 5 mg./kg.

ANTIDIABETIC ACTIVITY

| Compounds | Dose (mg/kg) | Decrease (%) |
|---|---|---|
| 1-Acetyl-3(5)-acetyloxymethyl-5(3)-methylpyrazole | 1.0 | 21.2 |
| 1-Butyryl-3(5)-butyryloxymethyl-5(3)-methylpyrazole | 1.0 | 24.2 |
| 1-Linolyl-3(5)-linolyloxymethyl-5(3)-methylpyrazole | 5.0 | 15.5 |
| 1-Benzoyl-3(5)-benzoyloxymethyl-5(3)-methylpyrazole | 1.0 | 9.0 |
| 1-(p-Chlorobenzoyl)-3-(p-Chlorobenzoyloxymethyl)-5-methylpyrazole | 1.0 | 11.4 |
| 1-Nicotinoyl-3-methyl-5-nicotinoyloxymethylpyrazole | 1.0 | 14.4 |
| 1-Cinnamoyl-3(5)-cinnamoyloxymethyl-5(3)-methylpyrazole | 1.0 | 19.7 |
| 1-(p-Nitrobenzoyl)-3-methyl-5-(p-nitrobenzoyloxymethyl)-pyrazole | 5.0 | 25.6 |

| | | |
|---|---|---|
| 1-(p-Chlorophenoxyisobutyryl)-3(5)-(p-chlorophenoxyisobutyryloxymethyl)-5(3)-methylpyrazole | 1.0 | 15.2 |
| 3-Acetyloxymethyl-5-methylpyrazole | 1.0 | 28.4 |
| 3-Linolyloxymethyl-5-methylpyrazole | 5.0 | 20.0 |
| 3-Benzoyloxymethyl-5-methylpyrazole | 1.0 | 18.3 |
| 3-(p-Chlorobenzoyloxymethyl)-5-methylpyrazole | 1.0 | 6.3 |
| 3-Cinnamoyloxymethyl-5-methylpyrazole | 1.0 | 26.2 |
| 3-(p-Nitrobenzoyloxymethyl)-5-methylpyrazole | 1.0 | 23.5 |
| 3-Butyryloxymethyl-5-methylpyrazole | 1.0 | 4.4 |
| 3-Nicotinoyloxymethyl-5-methylpyrazole | 1.0 | 15.0 |
| 3-(p-Chlorophenoxyisobutyryloxymethyl)-5-methylpyrazole | 1.0 | 10.5 |
| Tolbutamide | 10 | 4.0 |
| | 40 | 15.0 |

The present invention is described in detail with reference to examples, but is not limited to these examples.

EXAMPLE 1

To a mixture of 6.5 g. of 3-hydroxymethyl-5-methylpyrazole and 40 ml of pyridine, 9.1 g. of acetyl chloride was added dropwise while being cooled. After the completion of the addition, the mixture was heated under reflux for 30 minutes, and then the reaction mixture was cooled. The deposited pyridine hydrochloride was filtered off. Then, the filtrate was concentrated under the reduced pressure. The residue was further subjected to distillation under a reduced pressure, whereby 9.3 g. of a mixture of 1-acetyl-3-acetoxymethyl-5-methylpyrazole and 1-acetyl-3-methyl-5-acetoxymethylpyrazole was obtained at a boiling point of 146°–148° C./16 mm Hg as colorless, transparent oil. The ratio of the former to the latter of the mixture was 33:67 percent.

Elemental analysis (%) [figure in parenthesis is a calculated one (%)]:

| | |
|---|---|
| C | 55.22 (55.10) |
| H | 6.30 ( 6.12) |
| N | 14.39 (14.29) |

Nuclear magnetic resonance absorption spectrum (in heavy chloroform):
2.12, 2.25, 2.56, 2.63, 5.07, 5.40 and 6.21 ppm ($\delta$ value)

EXAMPLE 2

3 g. of 3-hydroxymethyl-5-methylpyrazole was treated with 5.1 g. of butyryl chloride in the same manner as in Example 1, and the residue was distilled under the reduced pressure, whereby 5.5 g. of a mixture of 1-butyryl-3-butyryloxymethyl-5-methylpyrazole and 1-butyryl-3-methyl-5-butyryloxymethylpyrazole was obtained at a boiling point of 123°–127° C./7 mm Hg. In this case, the ratio of the former to the latter was 53:47 percent.

Elemental analysis (percent) [figure in parenthesis is a calculated one (percent)]:

| | |
|---|---|
| C | 62.18 (61.90) |
| H | 8.06 ( 7.94) |
| N | 11.31 (11.11) |

Nuclear magnetic resonance absorption spectrum (in heavy chloroform):
2.25, 2.57, 5.08, 5.43, and 6.20 ppm ($\delta$ value)

EXAMPLE 3

2 g. of 3-hydroxymethyl-5-methylpyrazole was treated with 10.7 g. of linoloyl chloride in the same manner as in Example 1, and the thus obtained oil was purified by column chromatography, whereby 10.4 g. of a mixture of 1-linolyl-3-linolyloxymethyl-5-methylpyrazole and 1-linolyl-3-methyl-5-linolyloxymethylpyrazole was obtained as an oil.

In this case, the ratio of the former to the latter was 22:78 percent.

Elemental analysis (%):

| | Found | (Calculated) |
|---|---|---|
| C | 77.58 | (77.31) |
| H | 11.01 | (10.76) |
| N | 4.28 | ( 4.40) |

Nuclear magnetic resonance absorption spectrum (in heavy chloroform):
0.89, 1.33, 2.04, 2.25, 2.57, 2.77, 3.10, 5.08, 5.28, 5.34, 5.43 and 6.17 ppm ($\delta$ value)

EXAMPLE 4

5 g. of 3-hydroxymethyl-5-methylpyrazole was treated with 6.6 g. of benzoyl chloride in the same manner as in Example 1, and the residue was purified by column chromatography, whereby 13.3 g. of a mixture of 1-benzoyl-3-benzoyloxymethyl-5-methylpyrazole and 1-benzoyl-3-methyl-5-benzoyloxymethylpyrazole was obtained.

In this case, the ratio of the former to the latter was 52:48 percent.

Elemental analysis (%):

| | Found | (Calculated) |
|---|---|---|
| C | 71.54 | (71.24) |
| H | 4.84 | ( 5.03) |
| N | 8.47 | ( 8.75) |

Nuclear magnetic resonance absorption spectrum (in heavy chloroform):
2.26, 2.63, 5.38, 5.86, 6.42, 7.33–7.68 and 7.98–8.35 ppm ($\delta$ value)

EXAMPLE 5

3 g. of 3-hydroxymethyl-5-methylpyrazole was treated with 9.5 g. of p-chlorobenzoyl chloride in the same manner as in Example 1, and the residue was recrystallized with ethanol, whereby 9.8 g of 1-(p-chlorobenzoyl)-3-(p-chlorobenzoyloxymethyl)-5-methylpyrazole was obtained as colorless needle-like crystals. Melting point: 103°– 105° C.

Elemental analysis (%):

| | Found | (Calculated) |
|---|---|---|
| C | 58.53 | (58.61) |
| H | 3.39 | ( 3.60) |
| N | 6.98 | ( 7.20) |

Nuclear magnetic resonance absorption spectrum (in heavy chloroform):
2.67, 5.34, 6.37, 7.36–7.50, and 7.87–8.13 ppm ($\delta$ value)

EXAMPLE 6

3 g. of 3-hydroxymethyl-5-methylpyrazole was treated with 9.6 g. of nicotinoyl chloride hydrochloride in the same manner as in Example 1, and the residue was recrystallized with benzene-n-hexane, whereby 6.2 g. of 1-nicotinoyl-3-methyl-5-nicotinoyloxymethylpyrazole was obtained as light yellow prismic crystals. Melting point: 112°– 114.5° C.

Elemental analysis (%):

| | Found | (Calculated) |
|---|---|---|
| C | 63.57 | (63.35) |
| H | 4.17 | ( 4.38) |
| N | 17.29 | (17.38) |

Nuclear magnetic resonance absorption spectrum (in heavy chloroform):
2.31, 5.85, 6.48, 7.30–7.58, 8.25–8.60 and 9.32 ppm ($\delta$ value)

EXAMPLE 7

2 g. of 3-hydroxymethyl-5-methylpyrazole was treated with 6 g. of cinnamoyl chloride in the same manner as in Example 1, and the residue was recrystallized with ethanol, whereby 6.0 g. of a mixture of 1-cinnamoyl-3-cinnamoyloxymethyl-5-methylpyrazole and 1-cinnamoyl-3-methyl-5-cinnamoyloxymethylpyrazole was obtained as colorless needle-like crystals. Melting point: 93.5°– 128° C.

In this case, the ratio of the former to the latter was 38:62 percent.

Elemental analysis (%):

|   | Found | (Calculated) |
|---|---|---|
| C | 74.12 | (74.17) |
| H | 5.33 | ( 5.41) |
| N | 7.59 | ( 7.52) |

Nuclear magnetic resonance absorption spectrum (in heavy chloroform):

2.32, 2.68, 5.28, 5.70, 6.33, 6.65 and 7.27–8.02 ppm (δ value)

EXAMPLE 8

2 g. of 3-hydroxymethyl-5-methylpyrazole was treated with 6.2 g. of p-nitrobenzoyl chloride in the same manner as in Example 1, and the residue was recrystallized with ethyl acetate, whereby 4.4 g. of 1-(p-nitrobenzoyl)-3-methyl-5-(p-nitrobenzoyloxymethyl)-pyrazole was obtained as colorless needle-like crystals. Melting point: 170°–171°C.

Elemental analysis (%):

|   | Found | (Calculated) |
|---|---|---|
| C | 54.86 | (54.55) |
| H | 3.51 | ( 3.35) |
| N | 13.11 | (13.31) |

Nuclear magnetic resonance absorption spectrum (in heavy chloroform):

2.32, 5.88, 6.42 and 8.28 ppm (δ value)

EXAMPLE 9

To a mixture of 10 g. of 3-hydroxymethyl-5-methylpyrazole and 150 ml of pyridine, 41.5 g. of p-chlorophenoxyisobutyryl chloride was added dropwise. Then, the mixture was heated to about boiling point of the solvent, and then cooled. The deposited pyridine hydrochloride was removed. After the solvent was distilled off, 42.0 g. of a mixture of 1-(p-chlorophenoxyisobutyryl)-3-(p-chlorophenoxyisobutyryloxymethyl)-5-methylpyrazole and 1-(p-chlorophenoxyisobutyryl)-3-methyl-5-(p-chlorophenoxyisobutyryloxymethyl)pyrazole was obtained by column chromatographic purification. In this case, the ratio of the former to be latter was found 60:40 percent by nuclear magnetic resonance absorption spectrum.

$$n_D^{20} = 1.5518$$

Elemental analysis:

|   | Found | (Calculated) |
|---|---|---|
| C | 60.32% | (60.48%) |
| H | 5.16% | ( 5.24%) |
| N | 5.88% | ( 5.65%) |

Nuclear magnetic resonance absorption spectrum (in heavy chloroform):

1.57, 1.81, 2.19, 2.51, 5.06, 5.43, 5.86, 6.50–6.87 and 6.95–7.32 ppm (δ value)

EXAMPLE 10

To a mixture of 20.0 g. of 3-hydroxymethyl-5-methylpyrazole and 20.0 of acetic acid, 43.6 g. of acetic anhydride was added. Heating was effected under reflux for 3 hours, and then the solvent was distilled off under the reduced pressure. Then, by conducting distillation of the residue under a reduced pressure, 31.3 g. of a mixture of 1-acetyl-3-acetyloxymethyl-5-methylpyrazole and 1-acetyl-3-methyl-5-acetyloxymethylpyrazole was obtained as colorless, transparent oily matter at a boiling point of 116°–118° C./5.5 mm Hg. The ratio of the former to the latter was 36:64 percent.

Elemental analysis (%):

|   | Found | (Calculated) |
|---|---|---|
| C | 55.28 | (55.10) |
| H | 6.33 | ( 6.12) |
| N | 14.46 | (14.29) |

Nuclear magnetic resonance absorption spectrum (in heavy chloroform):

2.12, 2.25, 2.56, 2.63, 5.07, 5.40 and 6.21 ppm (δ value)

EXAMPLE 11

To a mixture of 12.1 g. of nicotinic acid, 60 ml of benzene and 10 g. of pyridine, 10.7 g. of ethyl chloroformate was added dropwise. Then, the mixture was subjected to stirring continuously for 1 hour in an ice-cooled state. Then, 30 ml of a pyridine solution containing 5 g. of 3-hydroxymethyl-5-methylpyrazole was added dropwise, and the mixture was stirred overnight at room temperature. Then, the solvent was distilled off, and the residue was subjected to extraction with benzene, and then washed with water. After the benzene was distilled off, the residue was purified with column chromatography, whereby 7.6 g. of 1-nicotinoyl-3-methyl-5-nicotinoyloxymethylpyrazole was obtained. Then, it was recrystallized with benzene-n-hexane. Melting point: 112° –114.5°C.

Elemental analysis (%):

|   | Found | (Calculated) |
|---|---|---|
| C | 63.44 | (63.35) |
| H | 4.09 | ( 4.38) |
| N | 17.22 | (17.38) |

Nuclear magnetic resonance absorption spectrum (in heavy chloroform): 2.31, 5.85, 6.46, 7.30–7.58, 8.25–8.60 and 9.32 ppm (δ value)

EXAMPLE 12

To a mixture of 10.9 g. of benzoic acid, 150 ml of pyridine, 9.6 g. of ethyl chloroformate was added dropwise. The mixture was treated in the same manner as in Example 11, and then 30 ml of a pyridine solution containing 5 g. of 3-hydroxymethyl-5-methylpyrazole was further added thereto dropwise. By conducting the same treatment as in Example 11, 8.1 g. of a mixture of 1-benzoyl-3-benzoyloxymethyl-5-methylpyrazole, and 1-benzoyl-3-methyl-5-benzoyloxymethylpyrazole was obtained as semicrystal. In this case, the ratio of the former to the latter was 55:45 percent.

Elemental analysis (%):

|   | Found | (Calculated) |
|---|---|---|
| C | 71.42 | (71.24) |
| H | 5.28 | ( 5.3) |
| N | 8.62 | ( 8.75) |

Nuclear magnetic resonance absorption spectrum (in heavy chloroform):

2.26, 2.63, 5.38, 5.86, 6.42, 7.33–7.68 and 7.98–8.35 ppm (δ value)

EXAMPLE 13

To a mixture of 13.0 g. of cinnamic acid and 100 ml of pyridine, 9.6 g. of methyl chloroformate was added dropwise. The mixture was treated in the same manner as in Example 1, and then 30 ml of a pyridine solution containing 5 g. of 3-hydroxymethyl-5-methylpyrazole was added thereto dropwise. By conducting the same treatment as in Example 11, 9.8 g. of a mixture of 1-cinnamoyl-3-cinnamoyloxymethyl-5-methylpyrazole and 1-cinnamoyl-3-methyl-5-cinnamoyloxymethylpyrazole was obtained, and then recrystallized with ethanol. Melting point: 93.5°–123° C. In this case the ratio of the former to the latter was 41:59 percent.

Elemental analysis (%):

|   | Found | (Calculated) |
|---|---|---|
| C | 74.33 | (74.17) |
| H | 5.27 | ( 5.41) |
| N | 7.67 | ( 7.52) |

Nuclear magnetic resonance absorption spectrum (in heavy chloroform):

2.32, 2.68, 5.28, 5.70, 6.33, 6.65 and 7.27–8.02 ppm (δ value)

EXAMPLE 14

10 g. of p-nitrobenzoic acid was treated with 5.7 g. of methyl chloroformate in the same manner as in Example 11, and then 20 ml of a pyridine solution containing 3.5 g. of 3-hydroxymethyl-5-methylpyrazole was added dropwise. By conducting the same treatment as in Example 11, 6.1 g. of 1-(p-nitrobenzoyl)-3-methyl-5-(p-nitrobenzoyloxymethyl)pyrazole was obtained. It was recrystallized with ethyl acetate. Melting point: 170°–171°C.

Elemental analysis (%):

|   | Found | (Calculated) |
|---|-------|--------------|
| C | 54.74 | (54.55) |
| H | 3.52  | ( 3.35) |
| N | 13.16 | (13.31) |

Nuclear magnetic resonance absorption spectrum (in heavy chloroform):
2.32, 5.88, 6.42 and 8.28 ppm ($\delta$ value)

EXAMPLE 15

10 of p-chlorobenzoic acid was treated with 7 g. of ethyl chloroformate in the same manner as in Example 11 and then 20 ml of a pyridine solution containing 3.6 g. of 3-hydroxymethyl-5-methylpyrazole was added thereto dropwise. By conducting the same treatment as in Example 11, 6.6 g. of 1-(p-chlorobenzoyl)-3-(p-chlorobenzoyloxymethyl)-5-methylpyrazole was obtained. It was recrystallized with ethanol. Melting point: 103°–105.5°C.

Elemental analysis (%):

|   | Found | (Calculated) |
|---|-------|--------------|
| C | 58.83 | (58.61) |
| H | 3.72  | ( 3.60) |
| N | 6.91  | ( 7.20) |

Nuclear magnetic resonance absorption spectrum (in heavy chloroform):
2.67, 5.34, 6.37, 7.36–7.50 and 7.87–8.13 ppm ($\delta$ value)

EXAMPLE 16

10 g. of linolic acid was treated with 4.6 g. of ethyl chlorocarbonate in the same manner as in Example 11, and then 20 ml of a pyridine solution containing 4 g. of 3-hydroxymethyl-5-methylpyrazole was added thereto dropwise. By conducting the same treatment as in Example 11, 9.5 g. of a mixture of 1-linolyloxymethyl-5-methylpyrazole and 1-linolyl-3-methyl-5-linolyloxymethylpyrazole was obtained as an oily product. In this case, the ratio of the former to the latter was 27:73 percent.

Elemental analysis (%):

|   | Found | (Calculated) |
|---|-------|--------------|
| C | 77.63 | (77.31) |
| H | 10.98 | (10.76) |
| N | 4.22  | ( 4.40) |

Nuclear magnetic resonance absorption spectrum (in heavy chloroform):
0.89, 1.33, 2.04, 2.25, 2.57, 2.77, 3.10, 5.08, 5.28, 5.34, 5.43 and 6.17 ppm ($\delta$ value)

EXAMPLE 17

9.3 g. of a mixture of 1-acetyl-3-acetyloxymethyl-5-methylpyrazole and 1-acetyl-3-methyl-5-acetyloxymethylpyrazole obtained in Example 10 was dissolved in 60 ml of benzene, and 4.3 g. of piperidine was added thereto. The mixture was heated for 3 hours under reflux, and then subjected to extraction with a 10 percent hydrochloric acid aqueous solution and further to neutralization with a 10 percent sodium hydroxide aqueous solution. After extraction with ether and distilling off the ether layer, 5.4 g. of 3-acetyloxymethyl-5-methylpyrazole was obtained by distillation at a boiling point of 178°–180° C./21 mm Hg as colorless transparent oil.
$n_D^{24} = 1.4902$.

Elemental analysis (%):

|   | Found | (Calculated) |
|---|-------|--------------|
| C | 54.61 | (54.55) |
| H | 6.71  | ( 6.49) |
| N | 17.92 | (18.18) |

EXAMPLE 18

10.4 g. of a mixture of 1-linolyl-3-linolyloxymethyl-5-methylpyrazole and 1-linolyl-3-methyl-5-linolyloxymethylpyrazole obtained in Example 3 was dissolved in 50 ml of xylene, and 1.8 g. of diethylamine was added thereto. The mixture was heated for 6 hours under reflux. Then, the reaction liquid was subjected to extraction with a 10 percent hydrochloric acid aqueous solution and then to neutralization with a 10 percent sodium hydroxide aqueous solution. After extraction with ether and distilling off the ether layer, the residue was purified by column chromatography, whereby 5.1 g. of 3-linolyloxymethyl-5-methylpyrazole was obtained as colorless, transparent oil.
$n_D^{24} = 1.4788$.

Elemental analysis (%):

|   | Found | (Calculated) |
|---|-------|--------------|
| C | 73.92 | (73.75) |
| H | 10.55 | (10.23) |
| N | 7.31  | ( 7.48) |

EXAMPLE 19

13.3 g. of a mixture of 1-benzoyl-3-benzoyloxymethyl-5-methylpyrazole and 1-benzoyl-3-methyl-5-benzoyloxymethylpyrazole obtained in Example 4 was dissolved in 50 ml of toluene, and then 3.1 g. of diethylamine was added thereto. The mixture was heated for 3 hours under reflux. Then, the reaction liquid was subjected to extraction with a 10 percent hydrochloric acid aqueous solution, and then evaporation to dryness under a reduced pressure. By recrystallizing the residue with ethyl acetate, 7.4 g. of 3-benzoyloxymethyl-5-methylpyrazole hydrochloride was obtained. Melting point: 137°–138.5° C.

Elemental analysis (%)

|   | Found | (Calculated) |
|---|-------|--------------|
| C | 57.23 | (57.03) |
| H | 5.38  | ( 5.15) |
| N | 11.13 | (11.09) |

EXAMPLE 20

9.8 g. of 1-(p-chlorobenzoyl)-3-(p-chlorobenzoyloxymethyl)-5-methylpyrazole obtained in Example 5 was treated in the same manner as in Example 18, and by recrystallizing the residue with ethyl acetate, 4.8 g. of 3-(p-chlorobenzoyloxymethyl)-5-methylpyrazole hydrochloride was obtained. Melting point: 147°–149° C.

Elemental analysis (%):

|   | Found | (Calculated) |
|---|-------|--------------|
| C | 49.12 | (50.17) |
| H | 3.88  | ( 4.18) |
| N | (9.76) |  |

EXAMPLE 21

6.0 g. of a mixture of 1-cinnamoyl-3-cinnamoyloxymethyl-5-methylpyrazole and 1-cinnamoyl-3-methyl-5-cinnamoyloxymethylpyrazole obtained in Example 7 was dissolved in 100 ml of ethanol, and 15 ml of 10 percent hydrochloric acid aqueous solution was added thereto. The mixture was heated at about 50° C. for 6 hours. After the completion of the reaction, the solvent was removed, and the residue was subjected to extraction with water. The water layer was evaporated to dryness under a reduced pressure, and the resulting residue was recrystallized with ethyl acetate-ethanol, whereby 1.9 g. of 3-cinnamoylmethyl-5-methylpyrazole hydrochloride was obtained. Melting point: 168.5°–170.5° C.

Elemental analysis (%):

| | Found | (Calculated) |
|---|---|---|
| C | 60.27 | (60.22) |
| H | 5.38 | ( 5.38) |
| N | 9.57 | (10.04) |

EXAMPLE 22

4.4 g. of 1-(p-nitrobenzoyl)-3-methyl-5-(p-nitrobenzoyloxymethyl)pyrazole obtained in Example 8 was dissolved in 70 ml of ethanol, and then 10 ml of 1N caustic soda aqueous solution was added thereto. The mixture was heated at 40° C. for 1 hour. Then, the reaction liquor was subjected to extraction with ether, and the ether layer was evaporated to dryness. The resulting residue was acidified with 1N hydrochloric acid, and the water layer was evaporated to dryness under a reduced pressure. The residue was recrystallized with isopropyl alcohol, whereby 1.8 g. of 3-(p-nitrobenzoyloxymethyl)-5-methylpyrazole hydrochloride was obtained. Melting point: 206°–206.5° C. (decomposition).

Elemental analysis (%):

| | Found | (Calculated) |
|---|---|---|
| C | 48.50 | (48.32) |
| H | 4.25 | ( 4.03) |
| N | 13.76 | (14.09) |

EXAMPLE 23

5.5 g. of a mixture of 1-butyryl-3-butyryloxy-methyl-5-methylpyrazole and 1-butyryl-3-methyl-5-butyryloxy-methyl-pyrazole obtained in Example 2 was dissolved in 50 ml of benzene, and then 2 g. of diethylamine was added thereto. The mixture was heated for 2 hours under reflux. Then, the reaction liquid was subjected to extraction with a 10 percent hydrochloric acid aqueous solution, to neutralization with a 10 percent caustic soda aqueous solution, and further to extraction with ether. After distilling off the ether layer, 3.6 g. of 3-butyryloxymethyl-5e[-methylpyrazole was obtained as colorless, transparent oil at a boiling point of 115°–118° C./1.0 mm Hg by distillation.

$n_D^{24} = 1.4849$.

Elemental analysis (%):

| | Found | (Calculated) |
|---|---|---|
| C | 59.16 | (59.32) |
| H | 7.51 | ( 7.74) |
| N | 15.11 | (15.37) |

EXAMPLE 24

6.2 g. of 1-nicotinoyl-3-methyl-5-nicotinoyloxy-methyl-pyrazole obtained in Example 6 was dissolved in 50 ml of dioxane, and then 1.6 g. of anilin was added thereto. The mixture was heated for 5 hours under reflux. The reaction solvent was removed, and the formed 3-nicotinoyloxymethylpyrazole and nicotinic acid anilin amide were separated by column chromatography, whereby 3.5 g. of oil was obtained. The oil was acidified with a 1 N hydrochloric acid aqueous solution and then evaporated to dryness under a reduced pressure. By recrystallizing the residue with ethanol, 309 g. of 3-nicotinoyloxymethyl-5-methylpyrazole dihydrochloride was obtained. Melting point: 194° C. (decomposition).

Elemental analysis (%):

| | Found | (Calculated) |
|---|---|---|
| C | 45.23 | (45.52) |
| H | 4.55 | ( 4.48) |
| N | 14.10 | (14.48) |

EXAMPLE 25

30 g. of the compound obtained in Example 9 was dissolved in 100 ml of toluene, and then 6.2 g. of piperidine was added thereto. The mixture was heated for 4 hours under reflux, and then cooled. The reaction liquid was subjected to extraction with a 10 percent hydrochloric acid aqueous solution, to neutralization with a 10 percent caustic soda aqueous solution and to extraction with ether. After distilling off the solvent, 16.4 g. of 3-(p-chlorophenoxyisobutyryloxymethyl)-5-methyl-pyrazole was obtained by purifying the residue by column chromatography.

$n_D^{25} = 1.5250$.

Elemental analysis (%):

| | Found | (Calculated) |
|---|---|---|
| C | 58.44 | (58.25) |
| H | 5.36 | ( 5.50) |
| N | 9.00 | ( 9.06) |

EXAMPLE 26

20 g. of the compound obtained in Example 9 was dissolved in a mixture of 50 ml of a 10 percent hydrochloric acid aqueous solution and 30 ml of ethanol, and the mixture was heated with stirring at 50° C. for 3 hours. After cooling, the reaction liquid was evaporated to dryness under a reduced pressure, 100 ml of water was added to the residue. The insoluble matters were removed by subjecting the residue to extraction with ether.

The water layer was neutralized with a 10 percent caustic soda aqueous solution and again subjected to extraction with ether. After concentration of the ether layer, 5.5 g. of 3-(p-chlorophenoxyisobutyryloxymethyl)-5-methylpyrazole was obtained by purifying the residue in the same manner as in Example 18.

What we claim is:

1. A pyrazole derivative of the formula:

$$\text{H}-\underset{\text{CH}_3}{\overline{\underset{\text{N}}{\bigcirc}}}-\text{CH}_2\text{O}-\text{CO}-\text{R}_1$$
$$\text{R}_2$$

wherein $R_1$ is an alkyl group having one–eight carbon atoms, an alkenyl group having two–18 carbon atoms, an aryl selected from the group consisting of phenyl and naphthyl, an aralkyl selected from the group consisting of benzyl, phenethyl and naphthylmethyl, a styryl, an aryloxyalkyl selected from the group consisting of phenoxymethyl and phenoxyisobutyl, or a heterocyclic ring selected from the group consisting of pyridyl, thienyl and furyl; wherein each alkyl, alkenyl, aryl, aralkyl, styryl or heterocyclic ring is unsubstituted or substituted by a chlorine, bromine, methyl, ethyl, nitro, acetylamino, hydroxyl, methoxy or ethoxy, and $R_2$ is a hydrogen atom or a group represented by the formula:

$$-\text{CO}-\text{R}_1$$

wherein $R_1$ has the same meaning as defined above.

2. A pyrazole derivative according to claim 1, wherein $R_1$ is methyl, ethyl, butyl, phenyl, naphthyl, p-nitrophenyl, p-chlorophenoxy-isopropyl, benzyl, styryl or 3-pyridyl.

3. A method for preparing a pyrazole derivative represented by the formula:

$$\text{H}-\underset{\text{CH}_3}{\overline{\underset{\text{N}}{\bigcirc}}}-\text{CH}_2\text{OCO}-\text{R}_1$$
$$\text{H}$$

wherein $R_1$ is as defined in claim 1, which comprises contacting a diacylated pyrazole derivative represented by the general formula:

$$\text{H}-\underset{\text{CH}_3}{\overline{\underset{\text{N}}{\bigcirc}}}-\text{CH}_2-\text{O}-\text{CO}-\text{R}_1$$
$$\text{COR}_1$$

wherein $R_1$ has the same meaning as defined above, with a primary organic amine, secondary amine or hydrazine.

4. A method according to claim 3, wherein the primary organic amine is ethylamine or aniline.

5. A method according to claim 3, wherein the secondary organic amine is diethylamine, piperidine or N-methylaniline.

6. A method according to claim 3, wherein the reaction is carried out in the presence of benzene, diozane, ethyl acetate or alcohol as solvent.

7. A method according to claim 3, wherein the reaction is carried out at 0° to 120° C.

8. A method according to claim 3, wherein the contact of 3-hydroxymethyl-5-methylpyrazole with the acylating agent, whose X represents a halogen atom, is carried out in the presence of pyridine or triethylamine.

9. A method according to claim 3, wherein the contact of 3-hydroxymethyl-5-methylpyrazole with the acylating agent is carried out in the presence of such a solvent as benzene, dioxane or pyridine.

10. A method for preparing a pyrazole derivative represented by the formula:

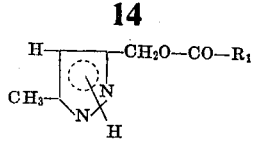

wherein $R_1$ is as defined as in claim 1, comprising contacting 3-hydroxymethyl-5-methylpyrazole with an acylating agent represented by the general formula: $X-CO-R_1$ wherein $R_1$ has the same meaning as defined above, and X represents a halogen atom or a group of -O-CO-$R_1$ or -O-CO-O-$R_3$, wherein $R_3$ represents an alkyl group having 1 to 4 carbon atoms, thereby to form a diacylated pyrazole derivative represented by the general formula:

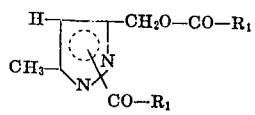

wherein $R_1$ is as defined as in claim 1, comprising contacting further contacting the thus obtained diacylated pyrazole derivative, if desired, with a primary organic amine, secondary organic amine or hydrazine.

11. 3-Acetyloxymethyl-5-methylpyrazole.

* * * * *